United States Patent Office 3,053,821
Patented Sept. 11, 1962

3,053,821
HYDROGENATED DERIVATIVES OF UNSATURATED POLYVINYL CHLORIDE
Richard W. Rees, Wilmington, Del., assignor to Shawinigan Chemicals Limited, Montreal, Quebec, Canada, a corporation of Canada
No Drawing. Filed July 23, 1959, Ser. No. 828,945
5 Claims. (Cl. 260—87.1)

This invention relates to the modified polyvinyl chloride resins prepared by reacting polyvinyl chloride resins with ammonia to produce unsaturated resins, and subsequently hydrogenating said unsaturated resins.

This application is a continuation-in-part of application Serial Number 635,121, filed January 22, 1957.

U.S. Patent 2,304,637, issued to Hardy, teaches that the halogen in many halogen-containing polymers can be replaced by ammonia-type nitrogen. It has now been found that hydrogen chloride can be eliminated in part from polyvinyl chloride resins dissolved in suitable solvents, by treatment with ammonia preferably at elevated pressure and temperatures above room temperature, to form useful unsaturated reactive products. Too prolonged contact of vinyl chloride homopolymer resin with ammonia at elevated temperatures and pressures is found to produce polyvinyl amine to a large extent.

The invention thus comprises a process for the preparation of a hydrogenated polymer derived from a saturated polymer of the group consisting of polyvinyl chloride and copolymers of vinyl chloride and vinyl acetate wherein the vinyl acetate does not exceed 20% by weight of the total copolymer, comprising hydrogenating, in the presence of a hydrogenation catalyst, an unsaturated polymer prepared by (a) reacting a solution of said saturated polymer in inert solvent with ammonia at a temperature between 20° C. and 150° C., and a pressure of at least 40 p.s.i.g., whereby hydrogen chloride is removed from the polymer and an unsaturated polymer is produced, and (b) recovering the unsaturated polymer from the solution. The invention also comprises the modified polyvinyl chloride resins which have been prepared by said process.

When a vinyl chloride-vinyl acetate copolymer is treated with ammonia to give an unsaturated resin according to this invention, it appears from the infrared absorption curve of the product that only hydrogen chloride, and not acetic acid, is eliminated. Increasing the time, temperature, or pressure during treatment of the copolymer with ammonia produces increasing proportions of unsaturation in the unsaturated copolymer product. The same general effects are observed during treatment of the homopolymers of vinyl chloride with ammonia up to the point where polyvinyl amine commences to be formed, at which point the product changes from an unsaturated polyvinyl chloride resin to an unsaturated copolymer comprising polyvinyl chloride and polyvinyl amine. The change is readily observable by the difference in color of the two materials, unsaturated polyvinyl chloride being substantially white and stable in air, and the material containing polyvinyl amine being dark, usually reddish-brown in color and unstable in air. These two materials also differ in their solubilities.

The ammonia used in the process of this invention can be liquid ammonia, or gaseous ammonia under pressure. Pressures of 40 pounds per square inch gauge (p.s.i.g.) and above are found to be suitable. At pressures below 40 p.s.i.g. the time required for treatment with ammonia is so long as to be impracticable. At increasing pressures of ammonia, the reaction is more rapid and the degree of unsaturation produced increases, subject to the limitation of the formation of polyvinyl amine when homopolymers of vinyl chloride are used, as indicated above.

While temperatures between 20° C. and 150° C. are operable, temperatures in the range 50°–120° C. are more convenient. Temperatures higher than 120° C. tend to cause an undesirable darkening of the product. Temperatures below 50° C. require pressures much higher than 100 p.s.i.g., or an unduly long period of treatment, to give the same degree of unsaturation. The higher temperatures of reaction produce more rapid reactions and higher degrees of unsaturation, as do the higher pressures.

Examples of suitable inert solvents are dioxane and dimethylformamide. Certain other solvents for polyvinyl chloride, for example, cyclohexanone, tetrahydrofurane, and nitrobenzene, are unsuitable as solvents in which to treat the resin with ammonia, because ammonia reacts with these solvents.

Recovery of the unsaturated polymer product, from the solution in which it is formed, is most readily and simply achieved by precipitating the product with water. Thus the solution can be poured into a relatively large quantity of water, or water can be added to the solution to precipitate the unsaturated resin. In either case, the product precipitates as a coarse granular powder. Recovery can also be achieved, for example, by evaporating the solvent from the solution; this method is more time-consuming and requires care to avoid partial decomposition of the product with heat.

Reaction of the polyvinyl chloride polymer or copolymer in suitable inert solvent with ammonia at elevated temperatures and pressures gives an unsaturated resin generally similar in physical properties to the starting material. Prolonged reaction of the homopolymer with ammonia at elevated temperatures and pressures produces a reddish-brown solid which is at least partly polyvinyl amine. For example, treatment of vinyl chloride homopolymer in dimethylformamide with ammonia at 100° C. and 150 p.s.i.g. for three hours forms a useful unsaturated polyvinyl chloride product, whereas the same treatment for 16 hours forms an undesirable amount of polyvinyl amine. This polyvinyl amine material is initially soluble in acetone, but becomes insoluble therein on exposure to air for a short time, presumably because of the formation of the carbonate salt of the amine. Films of the reddish-brown material freshly cast from acetone are flexible, but soon become hard and brittle on exposure to air, apparently because of their susceptibility to attack by atmospheric carbon dioxide.

The unsaturated linkages of the unsaturated resins can be hydrogenated, thereby introducing —$CH_2$—$CH_2$— groups into the polymer. The softening point is thus increased without affecting the solubility of the resins, and film flexibility is also improved.

Palladium black is an effective catalyst for hydrogenating the unsaturated resins at ordinary temperature and pressure. Other suitable catalysts are the noble metal catalysts described in chapters 8 and 9 of "Hydrogenation of Organic Substances" by C. Ellis; Van Nostrand, third edition, 1930. Various nickel catalysts, Raney nickel catalyst, for example, are also useful for hydrogenating the double bonds; these require temperatures of about 100°–120° C. and pressures of at least 200 p.s.i.

The following examples illustrate, but do not limit, the scope of the invention as hereinafter claimed.

EXAMPLE 1

Fifty grams of Vinylite resin VYHH (a copolymer of vinyl chloride and vinyl acetate, nominally consisting of 87 parts vinyl chloride and 13 parts by weight vinyl acetate and supplied by Carbide and Carbon Chemicals Co.) was dissolved in 500 ml. dioxane. The resin solution was placed in a 2-liter stainless steel stirred autoclave. The autoclave was closed, the air was swept out with nitrogen, and the nitrogen was evacuated. The autoclave was then connected to a cylinder containing gaseous ammonia under pressure. The pressure exerted by the ammonia alone was 350 pounds per square inch gauge (p.s.i.g.) at 100° C. The weight of ammonia added (Table I) was obtained from loss of weight of the cylinder. The pressure was then increased to 1000 p.s.i.g. by nitrogen pressure. The autoclave was maintained at 110° C. by heating coils. After the mixture was heated for 6 hours, the resin product was isolated from the solution by precipitation with water and was found to be generally similar in solubility and film properties to the starting material. This example was repeated, and chlorine and nitrogen analyses were carried out on the product. The average nitrogen content of the product was 0.091%, corresponding to 0.28% vinyl amine, while average chlorine was 44.6%, a decrease of 6.8% from the original value of 51.4%. The slight lowering of viscosity of a 0.2% solution of the product in cyclohexanone (Table I) indicated that a slight decrease in molecular weight of the original copolymer had occurred.

The product was analyzed for unsaturation by reaction with perbenzoic acid. A solution of perbenzoic acid in chloroform (57 grams per litre) was prepared by the method given in Organic Syntheses, Collective Vol. I, page 431. An excess of the solution was added to a solution of the unsaturated resin in chloroform and allowed to stand for two days at −5° C. A blank experiment was run in parallel. Determination of the amount of unreacted perbenzoic acid indicated that 0.204 gram of perbenzoic acid had reacted with 1.000 gram of unsaturated resin. If the value of 6.4 mole percent vinyl acetate in VYHH given by the chlorine analysis is assumed, calculation indicates the presence of 10.25 mole percent double bonds, or one double bond for every 9.8 monomer units in the product. The existence of unsaturation as indicated by reaction with perbenzoic acid was confirmed by the ultraviolet absorption spectrum of the product. Infrared analysis of the product after treatment with perbenzoic acid indicated that it had much higher absorption than the starting material in the general region characteristic for epoxy groups. A definite band which has been assigned to epoxy groups was found at 868 cm.$^{-1}$.

EXAMPLES 2, 3, AND 4

The reactor used in Examples 2, 3, and 4 was an unstirred pressure vessel, comprising a glass tube and a steel cylinder into which the glass tube could be fitted snugly. The glass tube was about 18 inches long and one inch in diameter, closed at the bottom and with a liquid capacity of 800 ml. The steel cylinder was closed at the bottom and flanged at the top. A flanged cover with pressure gauge attached could be bolted to the cylinder to maintain the contents under pressure. A weighed quantity of resin was dissolved in a solvent as indicated in Table I and cooled to −10° C. Liquid ammonia, 20 grams, was poured into the glass tube, which had previously been cooled in Dry Ice to about −40° C. The colorless resin solution was then slowly added to the glass tube. The glass tube was placed inside the steel cylinder, also previously cooled, and the flanged cover was bolted tightly in place. The reactor was then heated on a steam bath for either 3 or 16 hours, as recorded in Table I. The reactor was then cooled to −40° C., and the top removed. The contents of the glass tube were placed in a beaker to allow the ammonia to evaporate. The resin QYSJ used in Example 3 is a polyvinyl chloride resin containing no copolymerized material, and is sold commercially by Carbide and Carbon Chemicals Co.

The results of analyses of the products for chlorine content, and for mole percent unsaturation by the perbenzoic acid method as described in Example 1, are listed in Table I. The amount of unsaturation in the products of Examples 2–4 was much less than that of the product of Example 1. Estimations of the proportion of unsaturation based on the areas enclosed by the ultraviolet absorption curves of the products were in good agreement with the proportion of unsaturation as measured by the perbenzoic acid method. The unsaturation as calculated from the decrease in chlorine content, assuming one double bond for each chlorine atom lost, was more than twice as high as the value derived from the perbenzoic acid method. While the invention in no way depends on the interpretation of this difference, it may be suggested that the difference is due to bridge bonding, giving rise to some three-membered rings (cyclopropane units) or is due to steric hindrance affecting the reaction of the perbenzoic acid with the double bonds. The lowering of the viscosity of a 0.2% solution in cyclohexanone of the unsaturated product of Example 4 indicated a slight decrease in molecular weight.

*Table I*

| Example No. | 1 | 2 | 3 | 4 |
|---|---|---|---|---|
| Resin Type | VYHH | VYHH | QYSJ | VYHH. |
| Percent Chlorine in Resin | 51.4% | 51.4% | 56.7% | 51.4%. |
| Weight in Grams | 50 | 10 | 7 | 7. |
| Solvent | Dioxane | Dioxane | Dimethyl Formamide. | Dimethyl Formamide. |
| Solvent Volume, ml | 500 | 100 | 120 | 100. |
| Ammonia, Weight in Grams | 80 (gas) | 20 (liquid) | 20 (liquid) | 20 (liquid). |
| Time, Hours | 6 | 16 | 3 | 16. |
| Temperature | 110° C. | 100° C. | 100° C. | 100° C. |
| Pressure, p.s.i.g | 1,000 | 160 | 150 | 150. |
| Resin Product, Color | White | White | White | Yellow. |
| Unsaturation, Mole percent (Perbenzoic Method) | 10.25% | 2.74% | 4.00% | 7.7%. |
| Percent Chlorine in Product | 44.6% | 48.9% | 44.5% | 46%. |
| Viscosity of 0.2% Solution in Cyclohexanone, 20° C., in centipoises: | | | | |
| (A) Product | 2.58 | 2.65 | 2.775 | 2.60. |
| (B) Original Resin | 2.64 | 2.64 | 2.775 | 2.64. |

EXAMPLE 5

Seven grams of polyvinyl chloride resin QYSJ was dissolved in 120 grams of dimethylformamide and 15 grams of liquid ammonia was added, using the apparatus of Examples 2–4. Part of the ammonia pressure was then released, so that the pressure in the reactor was 42 p.s.i.g., when heated at 100° C. Heating was continued for 16 hours, after which the unsaturation of the resin was found to be 1.6 mole percent, measured by the perbenzoic method. The unsaturated product was a white resin similar in appearance to the starting material.

EXAMPLE 6

This example describes the hydrogenation of the unsaturated resin. 2.00 grams of resin prepared as in Example 2 was dissolved in 50 ml. dioxane; 1 ml. of acetic acid and 0.05 gram palladium black were added, and the mixture was hydrogenated at atmospheric pressure and room temperature; 18 ml. of hydrogen was taken up after 3 hours. The liquid was decanted from the palladium after centrifuging and the product was isolated by precipitation in 2 liters of water. The white resin obtained was thoroughly washed twice more with water and then dried in a vacuum desiccator. It weighed 2.00 grams. The fusion temperature of the product was about 20° higher than that of unmodified VYHH resin. A film was cast from acetone solution and was found to have better adhesion to glass and wood than had VYHH resin. The film was slightly more flexible than a VYHH film of equivalent thickness.

When a polyvinyl chloride resin is treated with ammonia, the amount of unsaturation in the resultant product is found to depend upon the type of resin (i.e. homopolymer or copolymer), the temperature and pressure during treatment, the solvent, and the length of time of treatment. The selection of pressures and other suitable reaction conditions which will give a desired degree of unsaturation, and avoid the formation of an undesirable amount of polyvinyl amine from the homopolymer, can be made according to the time and capacities of the elements of apparatus available for the reaction.

As many apparently widely different embodiments of this invention may be made without departing from the spirit and scope thereof, it is to be understood that the invention is not limited to the specific embodiments thereof except as defined in the appended claims.

What is claimed is:

1. A process for the preparation of a hydrogenated polymer derived from a saturated polymer of the group consisting of polyvinyl chloride and copolymers of vinyl chloride and vinyl acetate wherein the vinyl acetate does not exceed 20% by weight of the total copolymer, comprising hydrogenating, in the presence of a hydrogenation catalyst, an unsaturated polymer prepared by (a) reacting a solution of said saturated polymer in inert solvent with ammonia at a temperature between 20° C. and 150° C., and a pressure of at least 40 p.s.i.g. for a period of time sufficient, at the selected temperature and pressure, to produce an unsaturated resin but insufficient to produce appreciable substitution by amino groups, whereby hydrogen chloride is removed from the polymer and an unsaturated polymer is produced, and (b) recovering the unsaturated polymer from the solution.

2. A process as claimed in claim 1, in which the hydrogenation catalyst is palladium black.

3. A process for the preparation of a hydrogenated polymer derived from a saturated polymer of the group consisting of polyvinyl chloride and copolymers of vinyl chloride and vinyl acetate wherein the vinyl acetate does not exceed 20% by weight of the total copolymer, comprising hydrogenating, in the presence of a hydrogenation catalyst, an unsaturated polymer prepared by (a) reacting a solution of said saturated polymer, in an inert solvent of the group consisting of dioxane and dimethylformamide, with ammonia at a temperature between 20° C. and 150° C. and a pressure of at least 40 p.s.i.g. for a period of time sufficient, at the selected temperature and pressure, to produce an unsaturated resin but insufficient to produce appreciable substitution by amino groups, whereby hydrogen chloride is removed from the polymer and an unsaturated polymer is produced, and (b) recovering the unsaturated polymer from the solution.

4. A process as claimed in claim 3, in which the hydrogenation catalyst is palladium black.

5. A hydrogenated polymer derived from a saturated polymer of the group consisting of polyvinyl chloride and copolymers of vinyl chloride and vinyl acetate wherein the vinyl acetate does not exceed 20% by weight of the total copolymer, said hydrogenated polymer being prepared by hydrogenating, in the presence of a hydrogenation catalyst, an unsaturated polymer prepared by (a) reacting a solution of said saturated polymer in an inert solvent with ammonia at a temperature between 20° C. and 150° C., and a pressure of at least 40 p.s.i.g., for a period of time sufficient, at the selected temperature and pressure, to produce an unsaturated resin but insufficient to produce appreciable substitution by amino groups, whereby hydrogen chloride is removed from the polymer and an unsaturated polymer is produced, and (b) recovering the unsaturated polymer from the solution.

References Cited in the file of this patent

UNITED STATES PATENTS

| | | |
|---|---|---|
| 1,992,638 | Smith | Feb. 26, 1935 |
| 2,261,757 | Fawcett | Nov. 4, 1941 |
| 2,304,637 | Hardy | Dec. 8, 1942 |
| 2,536,114 | Weaver | Jan. 2, 1951 |
| 2,674,634 | Greensfelder et al. | Apr. 6, 1954 |
| 2,844,573 | Gloesenkamp | June 22, 1958 |
| 2,864,809 | Jones | Dec. 16, 1958 |